April 7, 1925.

E. A. GRAHAM

CABINET FOR USE WITH SOUND REPRODUCING DEVICES

Filed Aug. 29, 1924   5 Sheets-Sheet 1

1,532,811

INVENTOR
Edward Alfred Graham
BY Dowell & Dowell
his ATTORNEYS

April 7, 1925.  1,532,811

E. A. GRAHAM

CABINET FOR USE WITH SOUND REPRODUCING DEVICES

Filed Aug. 29, 1924    5 Sheets-Sheet 2

INVENTOR
Edward Alfred Graham
By Dowell and Dowell
his ATTORNEYS

April 7, 1925.  1,532,811
E. A. GRAHAM
CABINET FOR USE WITH SOUND REPRODUCING DEVICES
Filed Aug. 29, 1924    5 Sheets-Sheet 3
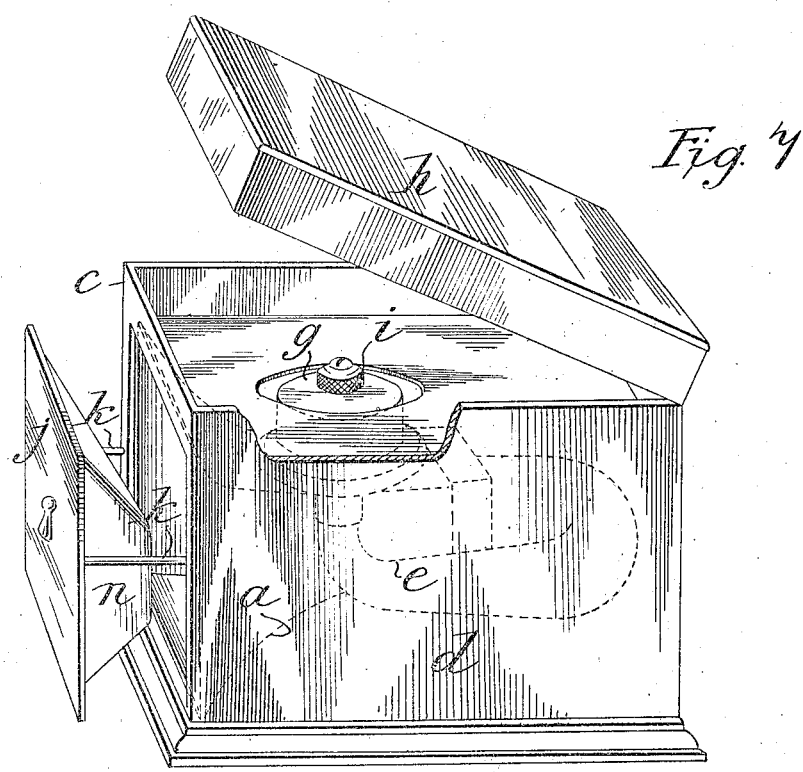
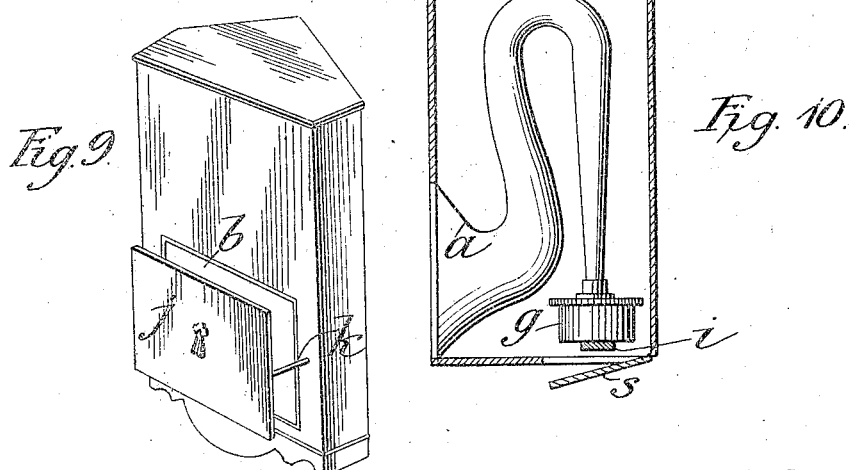
INVENTOR
Edward Alfred Graham
By Dowell and Dowell
his ATTORNEYS

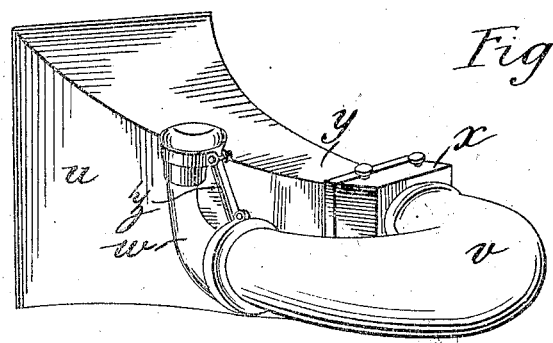
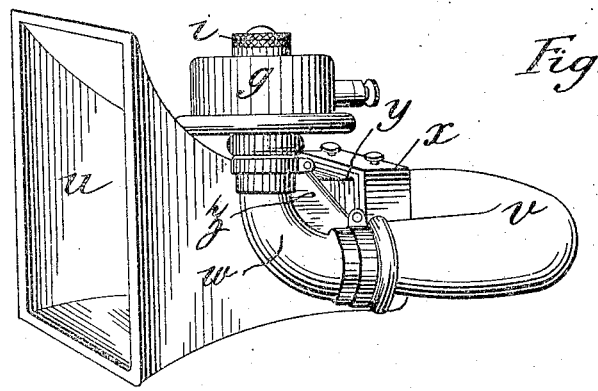
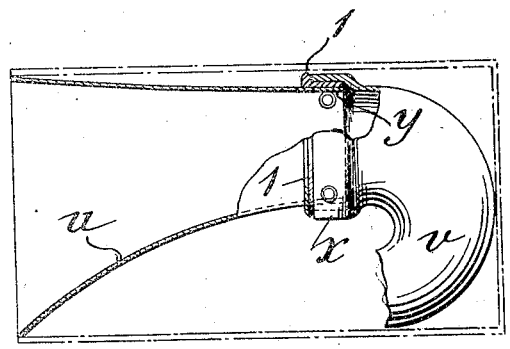

April 7, 1925.  
E. A. GRAHAM  
1,532,811  
CABINET FOR USE WITH SOUND REPRODUCING DEVICES  
Filed Aug. 29, 1924    5 Sheets-Sheet 5
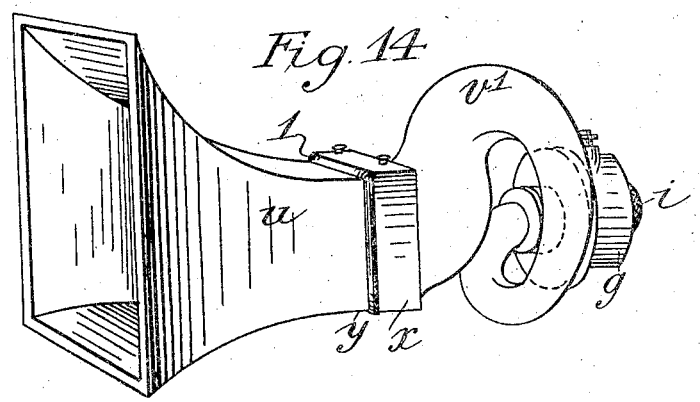
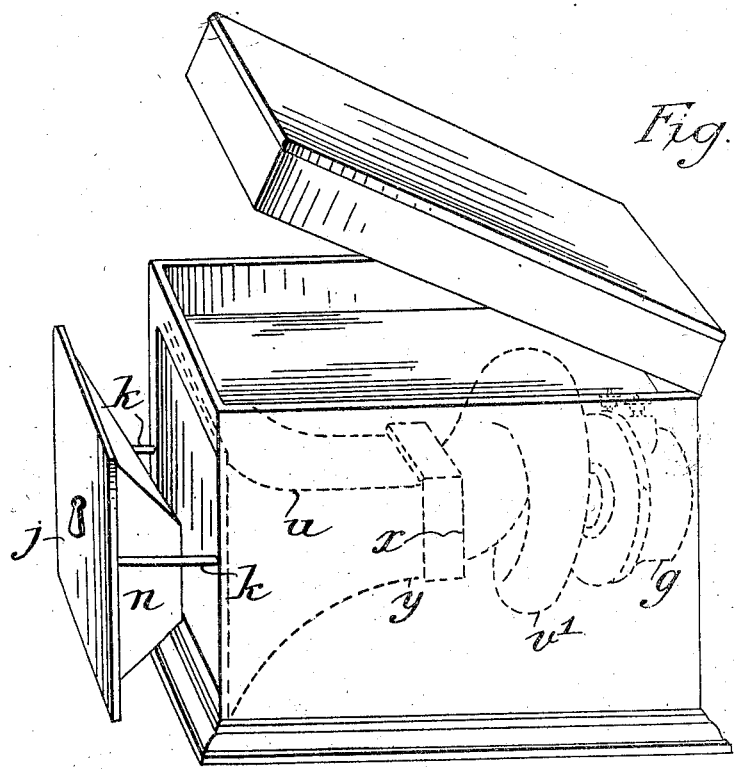
INVENTOR  
Edward Alfred Graham  
By Dowell & Dowell  
his ATTORNEYS Patented Apr. 7, 1925.

1,532,811

UNITED STATES PATENT OFFICE.

EDWARD ALFRED GRAHAM, OF BROCKLEY, ENGLAND.

CABINET FOR USE WITH SOUND-REPRODUCING DEVICES.

Application filed August 29, 1924. Serial No. 735,022.

*To all whom it may concern:*

Be it known that I, EDWARD ALFRED GRAHAM, a subject of the King of Great Britain and Ireland, residing at Brockley, in the county of London, England, have invented Improvements in or Relating to Cabinets for Use with Sound-Reproducing Devices, of which the following is a specification.

The loud speaking telephones used in connection with wireless receiving apparatus have heretofore been combined with a horn or trumpet (hereinafter called a trumpet) adapted to be supported upon a table or other support for use, no means other than the usual receiver adjusting screw being provided whereby the sound emitted from the trumpet can be varied or modulated to suit varying requirements.

The present invention has for one of its objects to enable the sounds emitted from the trumpet of a loud speaking telephone to be varied or modulated.

Another object of the invention is to provide a loud speaking telephone combination of the kind referred to which is more compact and better adapted for convenient use than those heretofore provided and which at the same time may admit of the efficiency of a contracted acoustic system being made equal to that of the more extended constructions of cabinets or cases and sound conduits generally associated with loud speaking telephone receivers.

According to the invention, a loud speaking telephone with its trumpet, is enclosed within a cabinet provided with a movable panel, cover or door arranged opposite the open mouth of the trumpet and capable of being moved from and towards the same so as to vary the volume of the sound emitted from the trumpet to the room or place where the cabinet is placed, and to modulate such sounds, means being provided, when necessary, whereby the position of the electromagnet of the telephone receiver in relation to the diaphragm of the receiver, can be adjusted to suit requirement from the exterior of the cabinet.

The trumpet can be made of various shapes as seen in side view and it and the telephone receiver can be variously arranged within the cabinet. Conveniently, the trumpet may be of the kind that is bent on itself so that its open flaring outlet end extends in the same direction as its inlet end to which the telephone receiver is attached and both ends be located in or near to a transverse plane common to them. Such a loud speaking telephone according to one arrangement, is so arranged within a cabinet that the open end of the trumpet and the telephone receiver are arranged adjacent to one side of the cabinet, the portion of which opposite the open end of the trumpet, is adapted to form a cover, panel or door (hereinafter called for brevity the cover) which normally forms part of the side of the cabinet and closes an opening therein opposite the open end of the trumpet. Such a cover may advantageously be carried by sliding rods so that it can be moved outward and inward parallel to itself, either directly by hand, or indirectly by suitable gearing, by a person located near to or at a distance from the cabinet, in the latter case through suitable connecting means, such as pneumatic, electric or mechanical means. The smaller end of the trumpet carrying the telephone receiver will, in the arrangement now being described, be arranged opposite a portion of the side of the cabinet that normally is not movable and through which may extend adjusting means whereby the relative positions of the electro-magnet and diaphragm of the receiver can be adjusted to suit requirements. Or the said side portion of the cabinet may be provided with an aperture through which an adjusting key can be inserted when desired. The casing of the telephone receiver can be adapted to be secured to the side of the cabinet and serve as the means for supporting the trumpet in position within the cabinet.

In another arrangement the bent trumpet with telephone receiver is so mounted within the cabinet that its large and small ends are arranged adjacent to the top of the cabinet which, in this case, is provided with a cover of the kind hereinbefore referred to.

In another arrangement, the trumpet is so shaped that its larger open end is adjacent to one side of the cabinet, which is provided with a cover as described whilst its smaller end with telephone receiver is adjacent to the top of the cabinet. In this case the adjusting means for the telephone receiver may, when necessary extend through the top of the cabinet, or this may be provided with an aperture adapted to admit of the insertion of an adjusting key. In this case also, the casing of the telephone receiver may be adapted to support the trumpet from the top of the cabinet.

In each case, the movable cover of the cabinet may be made hollow to serve as a sounding board and be so curved or shaped on its inner side as to guide or deflect outward, in any desired direction, the sounds emitted from the trumpet.

Within the cabinet may be arranged means of any known or suitable kind for wireless reception, or for amplifying the currents or oscillations passing from the said wireless receiving apparatus, or from external wireless receiving apparatus, to the telephone receiver.

The complete closure of the cover may be caused automatically to break the operating circuits of the receiving or amplifying devices used, the opening of the cover for a small distance sufficing to cause the circuits to be remade and the remainder of the opening motion serving to modulate the emitted sound to any desired degree.

Electric terminals or connections are conveniently attached to the cabinet for connection of the telephone receiver or current amplifying means to external wireless receiving apparatus.

The accompanying drawings illustrate several ways in which the invention can be carried into effect. Fig. 1 being a part sectional elevation and Fig. 2 a part sectional plan of one arrangement of cabinet embodying the invention. Fig. 3 is a perspective view of such a cabinet complete. Figs. 4 and 5 are part sectional elevations of two modifications. Fig. 6 is a part sectional plan of a third modification. Fig. 7 is a perspective view of a simple form of cabinet showing another horn arrangement. Fig. 8 is a perspective view of a cabinet intended to be supported flatwise against a wall and Fig. 9 is a perspective view of a cabinet adapted to be supported in the corner between two walls. Fig. 10 is a vertical transverse section through either Fig. 8 or Fig. 9.

Figs. 11 and 12 are perspective views and Fig. 13 a part sectional plan of a preferred construction of trumpet and sound conduit receiver.

Figs. 14 and 15 are views similar to Figs. 12 and 7 respectively of yet another horn arrangement and cabinet.

Figure 1:
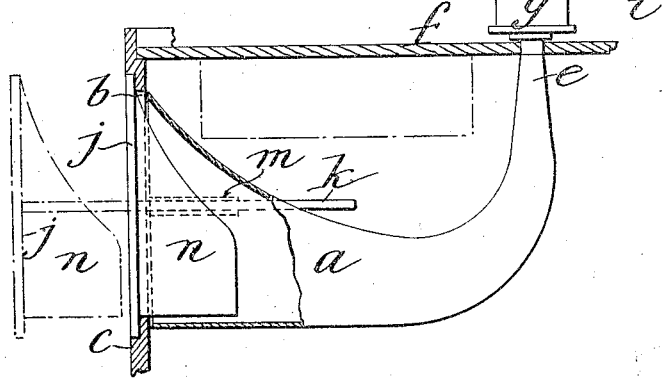
Figure 2:
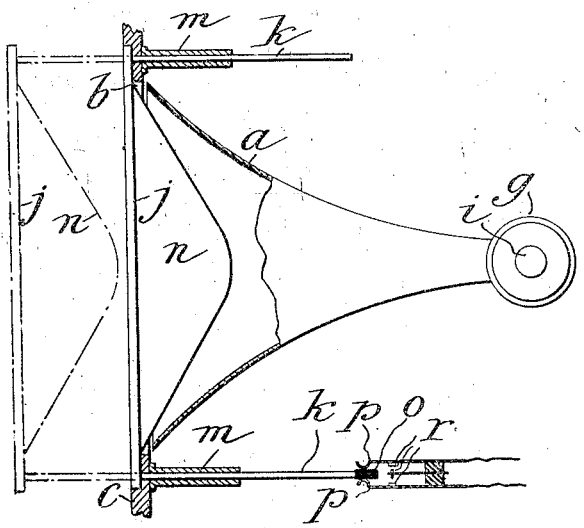
Figure 3:
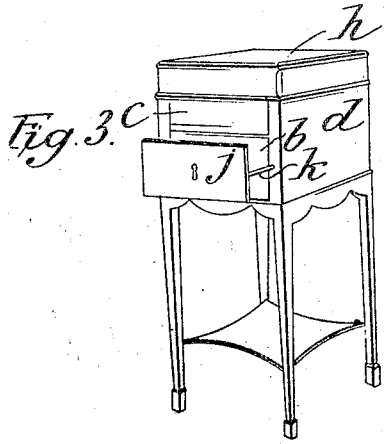

Referring first to Figs. 1, 2 and 3, $a$ is a trumpet, the mouth of which is adjacent to an opening $b$ in the front $c$ of a cabinet $d$ and having an arm $e$ extending through the top $f$ of the cabinet where is located the telephone receiver $g$. Access to the said receiver is obtainable by the lifting of a cover $h$ when the usual adjusting member $i$ can be directly manipulated. The opening $b$ in the front $c$ can be completely closed, or more or less opened, by advancing and withdrawing a cover $j$ which is provided with rods $k$ adapted to slide in tubular guides $m$ fixed within the cabinet. The cover $j$, which in this case is moved directly by hand, is provided with a portion $n$ which is preferably hollow and serves as the deflector and sound modulator referred to. One of the rods $k$ (Fig. 2) is shown as provided with an insulating plug $o$, which works between springs $p$ and serves to separate contacts $r$ and break any convenient circuit not required until the cover is sufficiently opened, the springs $p$ thereafter allowing the contacts $r$ to remain engaged, as the cover is further opened.

Figure 4:
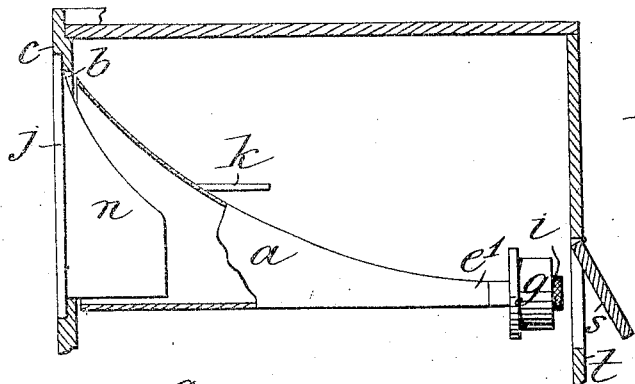

In Fig. 4 the trumpet has a straight arm $e^1$ and the telephone receiver $g$ is located within the cabinet, access being had to the adjusting member $i$, as by a key, through the hinged flap $s$.

Figure 5:
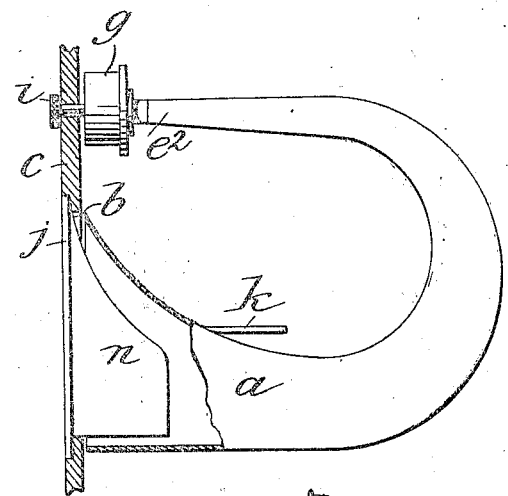

In Fig. 5 the arm $e^2$ of the trumpet is bent round so that the receiver $g$ is adjacent the front $c$ of the cabinet, the adjusting member $i$ protruding through the latter.

Figure 6:
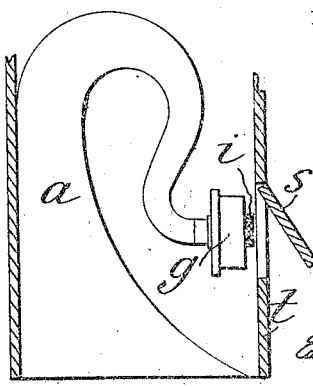

In Fig. 6 the trumpet is shaped as shown and access is gained to the adjusting member through a flap, as in Fig. 4 which however is located in the side wall $t$ of the cabinet.

Fig. 7, which shows a further modified arrangement, is self explanatory.

Figure 8:
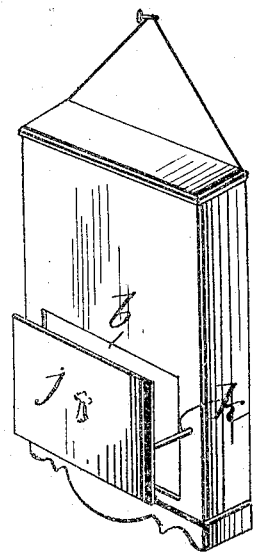

In the case of the hanging cabinets shown in Figs. 8 and 9, the trumpet may be arranged as in Fig. 10, the guide rods $k$ in Fig. 9 and in any other desired instance being telescopic if sufficient space for solid rods is not available.

In Figs. 11, 12 and 13 the flared or trumpet shaped outlet end portion $u$ of the sound conduit is of rectangular cross section and made of wood. The intermediate U shaped portion $v$ of the sound conduit is of metal and of gradually increasing circular cross sectional area from its inlet end $w$ to its outlet end where it is provided with an enlarged rectangular portion $x$ fitting over the inlet end $y$ of the flared or trumpet shaped portion of the said conduit. The upwardly bent inlet end portion $w$ of the sound conduit, carrying the telephonic receiver, is of circular cross section and may be ribbed or webbed as at $z$ to render it comparatively rigid.

The outlet, intermediate and inlet portions $y$, $v$, $w$ of the sound conduit are or may advantageously be jointed together with the aid of interposed material of a nonsonorous character, as for instance rubber, so that the several portions shall be acoustically insulated from one another but in some cases, as illustrated, the said upwardly bent inlet end portion $w$ of the sound conduit to which the telephonic receiver $g$ is attached, may be formed as a substantial tubular element of non-sonorous material, as for instance rubber of medium hardness and rigidity. The connection of the horizontally disposed telephone receiver $g$ to the upper end of the upwardly bent inlet portion $w$ of the sound conduit, when the latter is not made of non-sonorous material, is or may be effected by the aid of a socket or hollow plug, preferably of rubber or equivalent non-sonorous material, carried by the telephonic receiver and fitting over or into the said upper end of the sound conduit. 1 is a washer of rubber separating the portions $v$ and $u$.

The telephonic combination hereinbefore described may be acoustically insulated as a whole from the casing in which it is disposed, as by the interposition of washers or buffers of non-sonorous material such for example as india-rubber or felt.

From Figs. 14 and 15 it will be further shown that other modifications may be readily employed the receiver $g$ in this example being connected to the trumpet shaped portion $u$ by a conduit $v^1$ of helico-spiral form which affords a somewhat greater capacity than the other forms illustrated. Apart from the advantage of greater length of conduit to which the greater capacity referred to is due, this modification allows of the receiver $g$ being so positioned that access can be gained from the rear of the cabinet to the means of adjustment for affording the maximum efficiency of the electro-magnetic section.

What I claim is:—

1. A loud speaking telephone comprising a cabinet, a sound amplifying trumpet enclosed therein and arranged with the open mouth of the trumpet coincident with an opening in one wall of the cabinet and a cover arranged opposite the open mouth aforesaid, said cover being constructed to serve as a sounding board and sound deflector and adjustable toward and from said mouth in a plane substantially at right angles thereto so as to vary the volume of the sound emitted from the trumpet and to modulate such sounds, substantially as described.

2. A loud speaking telephone according to claim 1 in which the cover of the cabinet associated with the mouth of the trumpet is made hollow to serve as a sounding board and sound deflector, substantially as described.

3. A loud speaking telephone according to claim 1 in which the cover associated with the mouth of the trumpet is mounted to slide, substantially as described.

Signed at London, England, this nineteenth day of August, 1924.

EDWARD ALFRED GRAHAM.